(12) United States Patent
Weschke

(10) Patent No.: US 8,241,406 B2
(45) Date of Patent: Aug. 14, 2012

(54) DEVICE AND METHOD FOR SEPARATING WET PAINT OVERSPRAY

(75) Inventor: Jürgen Weschke, Weil der Stadt (DE)

(73) Assignee: Dürr Systems GmbH, Bietigheim-Bissingen (DE)

( * ) Notice: Subject to any disclaimer, the term of this patent is extended or adjusted under 35 U.S.C. 154(b) by 48 days.

(21) Appl. No.: 12/859,755

(22) Filed: Aug. 19, 2010

(65) Prior Publication Data

US 2011/0041691 A1    Feb. 24, 2011

Related U.S. Application Data

(63) Continuation of application No. PCT/EP2009/000977, filed on Feb. 12, 2009.

(30) Foreign Application Priority Data

Feb. 20, 2008    (DE) .......................... 10 2008 010 189

(51) Int. Cl.
 *B01D 46/00*    (2006.01)
(52) U.S. Cl. ............. 95/278; 55/301; 55/385.2; 55/430; 55/432; 55/466; 55/524; 55/DIG. 46; 95/285; 95/286; 96/372; 118/309; 118/326
(58) Field of Classification Search .................. 55/308, 55/318, 339, 385.2, DIG. 46; 95/267, 280, 95/285; 96/372, 373; 118/309, 326; 427/300; 454/50, 53, 55, 187
See application file for complete search history.

(56) References Cited

U.S. PATENT DOCUMENTS

| | | | |
|---|---|---|---|
| 1,710,469 A | | 4/1929 | Boardman |
| 4,257,784 A | * | 3/1981 | Gebhard et al. ................ 95/210 |
| 5,766,355 A | * | 6/1998 | Josefsson et al. ............. 118/326 |
| 6,010,571 A | * | 1/2000 | Josefsson et al. ............. 118/326 |
| 6,471,737 B2 | * | 10/2002 | Cole et al. .................... 55/385.2 |

(Continued)

FOREIGN PATENT DOCUMENTS

DE     3925818     2/1991

(Continued)

OTHER PUBLICATIONS

International Searching Authority, International Search Report issued for PCT/EP2009/000977, mailed May 20, 2009, 4 pages.

(Continued)

*Primary Examiner* — Duane Smith
*Assistant Examiner* — Minh-Chau Pham
(74) *Attorney, Agent, or Firm* — Hanley, Flight & Zimmerman, LLC

(57) ABSTRACT

In order to provide a device for separating wet paint overspray from a stream of crude gas containing overspray particles which includes at least two filter devices each of which has an inlet opening through which a partial stream of crude gas enters the respective filter device and each of which includes at least one filter element for separating the overspray from the partial stream of crude gas, which allows one to maintain the fluidity of the mixture including of filter aid material and wet paint overspray that has been cleansed from the filter elements in the filter aid material reservoirs in a simple and efficient manner, it is proposed that the device should comprise at least one reservoir for receiving material which has been cleansed from the filter elements of a plurality of filter devices and a mixing device for mechanically blending the cleansed material from a plurality of filter devices.

15 Claims, 10 Drawing Sheets

U.S. PATENT DOCUMENTS

| | | | |
|---|---|---|---|
| 6,723,145 B2 * | 4/2004 | Cole | 55/342 |
| 6,723,169 B2 * | 4/2004 | Hihn et al. | 118/309 |
| 7,665,414 B2 * | 2/2010 | Shutic et al. | 118/309 |
| 7,959,722 B2 * | 6/2011 | Wieland et al. | 96/372 |

FOREIGN PATENT DOCUMENTS

| | | |
|---|---|---|
| DE | 4211465 | 10/1993 |
| DE | 4411058 | 10/1995 |
| DE | 102005013711 | 9/2006 |
| DE | 102005048580 | 4/2007 |
| GB | 598428 | 2/1948 |
| JP | 50112280 | 9/1975 |
| JP | 5256457 | 5/1977 |
| JP | 62163721 | 7/1987 |
| JP | 08038927 | 2/1996 |
| JP | 08117582 | 5/1996 |
| JP | 11128642 | 5/1999 |
| WO | 04000497 | 12/2003 |
| WO | 2009026987 | 3/2009 |

OTHER PUBLICATIONS

International Preliminary Examination Authority, International Preliminary Examination Report issued for PCT/EP2009/000977, Jul. 7, 2010, 11 pages.

German Patent Office, German Search Report issued for German patent application No. 102008010189.3, Mar. 3, 2009, 4 pages.

European Patent Office, Office Action issued in EP Application No. 09712964.7, dated Jun. 6, 2011, 5 pages.

\* cited by examiner

DEVICE AND METHOD FOR SEPARATING WET PAINT OVERSPRAY

RELATED APPLICATION

This application is a continuation application of PCT/EP2009/000977 filed Feb. 12, 2009, the entire specification of which is incorporated herein by reference.

FIELD OF THE DISCLOSURE

The present invention relates to a device for separating wet paint overspray from a stream of crude gas containing overspray particles which comprises at least two filter devices wherein, for their part, each device comprises an inlet opening through which a partial stream of crude gas enters the respective filter device and at least one respective filter element for separating the overspray from the partial stream of crude gas.

BACKGROUND

In the case of such a known device, a dry process for separating the wet paint overspray from the respective stream of crude gas is effected after a fluidic particle-like filter aid material referred to as a "precoat" material has been added to the stream of crude gas.

This filter aid material serves as a barrier layer that is deposited on the surfaces of the filter elements in order to prevent these surfaces from sticking together due to overspray particles adhering thereto. By periodically cleaning the filter elements, the mixture consisting of filter aid material and wet paint overspray from the filter elements ends up in filter aid material reservoirs from which it can be sucked out in order to be disposed off or reused as a filter aid material. Furthermore, the mixture of filter aid material and wet paint overspray located in the filter aid material reservoir can be fluidised by means of pulses of compressed air issuing from a compressed air lance so as to cause it to rise up out of the filter aid material reservoir towards the filter elements where it is then deposited.

A critical point for the reliability of the process when using such a device for separating wet paint overspray is that of the flow properties of the mixture consisting of filter aid material and wet paint overspray. If the flow properties are no longer adequate, then an exchange of material can no longer take place in the filter aid material reservoirs. The material in the filter aid material reservoirs can no longer flow to the extraction opening and the extent to which the containers are filled will remain above the value which terminates the suction process. In this case, the painting process has to be interrupted and the material in the filter aid material reservoirs must be loosened manually in such a way as to restore the fluidity thereof and thereby enable it to be sucked out.

Even if the filter aid material reservoirs are provided with fluid bases in the form of plates consisting of a sintered synthetic material so as to enable the material contained in the filter aid material reservoirs to be fluidised by supplying compressed air thereto, then sufficient loosening of the material for the purposes of re-establishing the desired flow properties of the material cannot be ensured thereby. Namely, the adherent properties of the particles in the mixture consisting of filter aid material and wet paint overspray have a substantially greater effect than the forces produced by the flow of the compressed air so that the layer formed by the material is lifted as a whole or else channels are formed in the material through which the compressed air flows upwardly. In addition, the process of fluidising the material is made more difficult due to the large spread in the size distribution of the particles in the filter aid material (in a range of approximately 2 µm to approximately 100 µm). In order to fluidise a fill of particles having a diameter of 2 µm to a porosity of approximately 0.85, it suffices to have a flow rate of 0.00016 m/s. For the purposes of fluidising a fill of particles having a diameter of 100 µm, one needs a flow rate of 0.34 m/s, i.e. an approximately 2,000 times higher rate of flow than is the case for particles having a diameter of 2 µm. Consequently, even if the forces produced by the flow should outweigh the adhesive forces, uniform fluidisation conditions cannot be established merely by feeding in compressed air. Rathermore, a sort of classifying process will take place, whereby the fine components will be carried away but the coarse components will remain immovable on the bottom of the filter aid material reservoir. This classifying effect also occurs if the filter aid material is whirled up by bursts of compressed air by means of fluidising devices arranged above the filter aid material reservoirs.

SUMMARY

The object of the present invention is to produce a device for separating wet paint overspray of the type mentioned hereinabove which will enable the fluidity of the mixture consisting of filter aid material and the wet paint overspray that has been cleansed off the filter elements in the filter aid material reservoirs to be maintained in a simple and efficient way.

In accordance with the invention, this object is achieved in the case of a device for separating wet paint overspray incorporating the features mentioned in the first part of claim 1 in that the device comprises at least one reservoir for receiving the material that has been cleansed from the filter elements of a plurality of different filter devices and a mixing device for mechanically mixing the cleansed material from a plurality of different filter devices.

The concept underling the solution in accordance with the invention is that material that has been cleansed from a plurality of filter devices through each of which there flows a partial stream of crude gas is received in one and the same reservoir and mechanically blended within the reservoir by means of a mixing device in order to mechanically destroy the adhesion between the particles of cleansed material and, in this way, prevent "growth" of the reservoir with cleansed material and thereby obtain the greatest possible degree of homogeneity in the material present in the reservoir due to the process of intermixing the material that has been cleansed from different filter devices.

A more reliable process is thereby achieved, and the material in the reservoir can be concentrated so as to produce a higher level of concentration of the wet paint overspray contained in the reservoir without endangering the fluidity of the mixture consisting of the filter aid material and the wet paint overspray.

On the other hand however, if each filter device has its own separate filter aid material reservoir associated therewith, then provision must be made for a very large number of such filter aid material reservoirs and they must be constantly and precisely checked in regard to their material composition. Due to the differing loads imposed on the various filter devices by the wet paint overspray, this depending upon the location of a particular filter device relative to the region of application whereat the wet paint overspray enters the stream of crude gas, the concentration factor, i.e. the respective proportion of the wet paint overspray to the total quantity of material present in the filter aid material reservoir, will differ markedly from filter aid material reservoir to filter aid material reservoir. The fluidity of the concentrated filter aid material/paint mixture differs accordingly. If the extraction process is no longer being implemented correctly in just one of the filter aid material reservoirs, then this leads to the process being interrupted with the need for manual intervention. The times for the exchange of material must be individually set for each filter aid material reservoir and they need to be selected in such a way as to reliably ensure that the concentration of wet paint overspray is above the critical range thereof. This means there will be a high consumption of materials both in regard to fresh filter aid material as well as the filter aid material which is loaded with wet paint overspray and there will be a correspondingly high expenditure for the storage and transportation of the filter aid material.

In contrast thereto, only one reservoir must be checked in regard to the level of material therein and the concentration factor in the case of the device in accordance with the invention for separating wet paint overspray for several filter devices through each of which there is a flow of a partial stream of crude gas. Furthermore, due to the fact that the cleansed material from a plurality of different filter devices is mechanically blended, it is thereby possible to compensate for particularly high concentrations of wet paint overspray in the material cleansed from a particular filter device by blending it with material that is less heavily loaded with wet paint overspray which has been cleansed from other filter devices. Consequently, the material in the larger reservoir can be concentrated to a higher level of concentration of the wet paint overspray without impairing the fluidity of the mixture consisting of the filter aid material and the wet paint overspray.

Moreover, the constructional costs for the production of a single large reservoir are smaller than the expenditure required for the production of many small filter aid material reservoirs which are each associated with just one filter device.

Due to the larger amount of space in the interior of the reservoir associated with a plurality of filter devices, it is also much simpler to install a suitable mixing device in the interior of the reservoir.

Preferably, the reservoir is in the form of a trough which extends from a region located vertically below a first filter device into a region located vertically below a second filter device, whereby in principle, as many further filter devices as desired can be arranged between the first filter device and the second filter device.

In one preferred embodiment of the invention, provision is made for the reservoir to receive material which has been cleansed from at least three different filter devices.

The mixing device preferably comprises at least one mixing tool which is rotatable about a substantially horizontally oriented axis of rotation. The effect achieved thereby is that the material contained in the reservoir is thoroughly blended in a direction along the axis of rotation so that there will be no differences in the concentration of the material in the reservoir.

In order to enable thorough mixing to be achieved even in the case where long reservoirs are used for accommodating the material that has been cleansed from the filter elements of a multiplicity of filter devices, provision may be made for the mixing device to comprise at least two rotary shafts which are rotatable about a substantially horizontally oriented axis of rotation and which are arranged one behind the other in the direction of the axis of rotation.

By the use of a plurality of shorter rotary shafts instead of a just a single long rotary shaft for mounting the mixing tools, the drive power required for producing a rotatory movement of the mixing tools can be reduced.

In order to destroy the binding forces between the particles of the material in the reservoir, the mixing device can be provided with any suitable mixing tools.

In particular, provision may be made for the mixing device to comprise at least one paddle, at least one ploughshare and/or at least one helix, screw or spiral.

In order to thoroughly intermix the material disposed in the reservoir, it is expedient for the mixing device to comprise at least two helices having opposed directions of rotation.

Since a classifying effect, whereby the fine proportion of the material is removed from the reservoir, does not arise during the process of mechanically intermixing the material in the reservoir, the particle size distribution of the filter aid material in the device in accordance with the invention can be selected in such a way as to achieve as large a surface area as possible for embedding the wet paint particles and thus also removing adhesion.

In particular, a filter aid material can be used in which at least 20 weight percent of the particles have a particle size of less than 2 μm.

The density of the filter aid material being used, stone dust for example, can amount to approximately 2.75 g/cm$^3$ for example.

In the device in accordance with the invention, filter aid materials the bulk material characteristics of which could be described as cohesive are also capable of being used.

If the reservoir comprises a material outlet opening for the purposes of separating filter aid material which is loaded with wet paint overspray from the reservoir, then it is expedient for the mixing device to comprise a mixing tool which assists the process of discharging the material through the material outlet opening.

Furthermore, the reservoir may comprise an inlet for fresh filter aid material in order to reduce the concentration of wet paint overspray in the material present in the reservoir by supplying fresh filter aid material thereto.

Preferably, the inlet for the fresh filter aid material is arranged in a first end region of the reservoir and the reservoir comprises a material outlet opening which is arranged in a second end region of the reservoir located opposite the first end region.

Particularly thorough intermixing of the material contained in the reservoir is obtained if, in the course of a full revolution, the mixing device sweeps over a mixing region and if the reservoir comprises a mixing section the inner contour of which is adapted to the outer contour of the mixing region.

It is particularly expedient, if the reservoir comprises a mixing section and if the mixing device sweeps over substantially the entire mixing section of the reservoir in the course of a full revolution.

Preferably thereby, provision is made for substantially all the material accommodated by the reservoir to be arranged in the mixing section of the reservoir in the normal operation of the device.

The mixing section of the reservoir can, in particular, be substantially cylindrical or in the form of a section of a cylinder.

Furthermore, the present invention relates to a method for separating wet paint overspray from a stream of crude gas containing overspray particles.

A further object of the present invention is to provide such a method for the separation of wet paint overspray which will enable adequate fluidity of the mixture consisting of filter aid material and wet paint overspray that has been cleansed from the filter elements to be maintained in the filter aid material reservoirs in a simple and efficient way.

In accordance with the invention, this object is achieved by a method for separating wet paint overspray from a stream of crude gas containing overspray particles which comprises the following process steps:

dividing the stream of crude gas into at least two partial streams of crude gas which enter at least two different filter devices through different inlet openings, said filter devices each comprising at least one filter element for separating the overspray from the respective partial stream of crude gas;

separating the overspray from the partial streams of crude gas by means of the filter elements;

cleansing material from the filter elements of a plurality of different filter devices;

collecting the cleansed material from the a plurality of different filter devices in the same reservoir;

mechanically intermixing the cleansed material from the plurality of different filter devices in the reservoir by means of a mixing device.

The reservoir is preferably arranged directly vertically below the filter devices from which the reservoir receives the cleansed material.

Furthermore, provision may be made for the partial streams of crude gas to be passed at least partially through the reservoir in order to absorb filter aid material from the reservoir.

Further features and advantages of the invention form the subject matter of the following description and the graphical illustration of exemplary embodiments.

DETAILED DESCRIPTION

Figure 1:
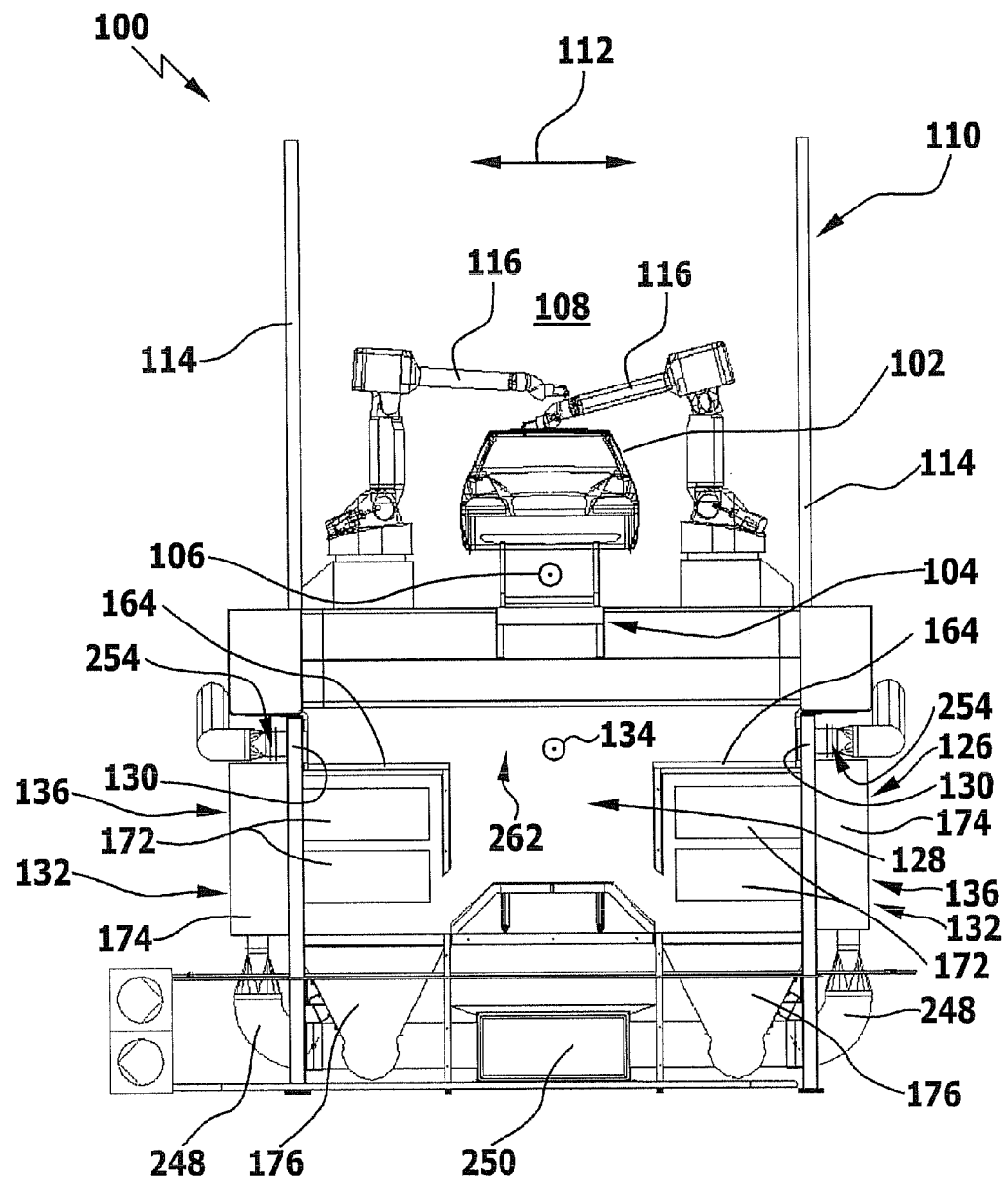
FIG. 1 shows a schematic vertical cross section through a painting booth incorporating a device for separating wet paint overspray from a stream of crude gas containing overspray particles which is arranged below it wherein the device comprises a flow chamber that is arranged below the painting booth and a plurality of filter modules that are arranged on both sides of the flow chamber.

Similar or functionally equivalent elements are designated by the same reference symbols in each of the Figures.

A plant for spraying vehicle bodies 102 which bears the general reference 100 and is illustrated in FIGS. 1 to 7 comprises a purely schematically illustrated conveyor device 104 by means of which the vehicle bodies 102 can be moved in the direction of conveying 106 through an application area 108 in a painting booth which bears the general reference 110.

The application area 108 is the interior of the painting booth 110 which is bounded on each side of the conveyor device 104 in a horizontally extending transverse direction 112 that is perpendicular to the direction of conveying 106, which itself corresponds to the longitudinal direction of the painting booth 110, by a respective booth wall 114.

Spraying devices 116, which are in the form of painting robots for example, are arranged on both sides of the conveyor device 104 in the painting booth 110.

Figure 2:
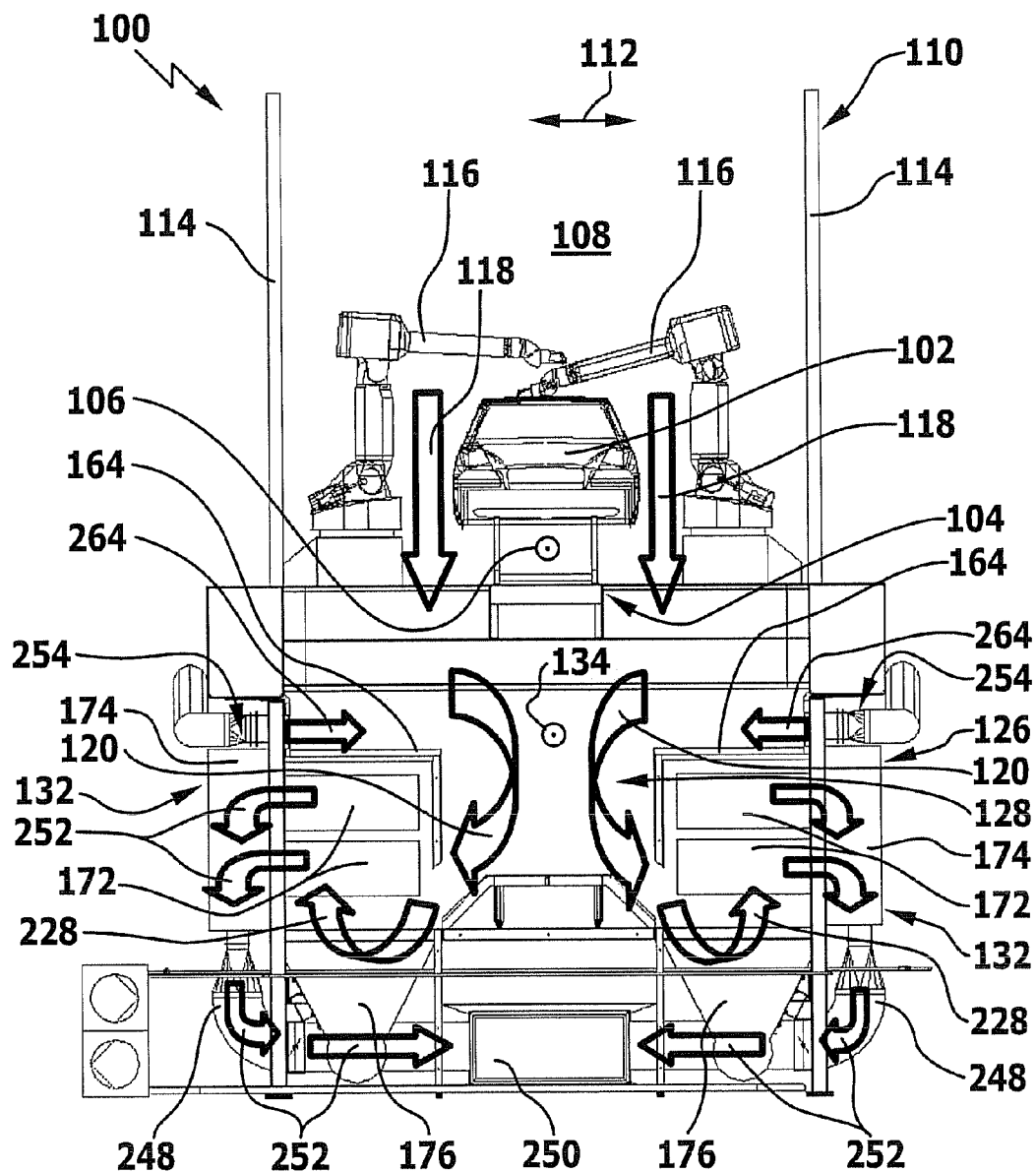
FIG. 2 a schematic vertical cross section through the plant depicted in FIG. 1 which corresponds to FIG. 1 but wherein the respective directions of flow of the crude gas, the exhaust air emerging from the filter modules and the air supply that is being fed into the flow chamber for the production of transverse air curtains are additionally indicated by arrows.
Figure 3:
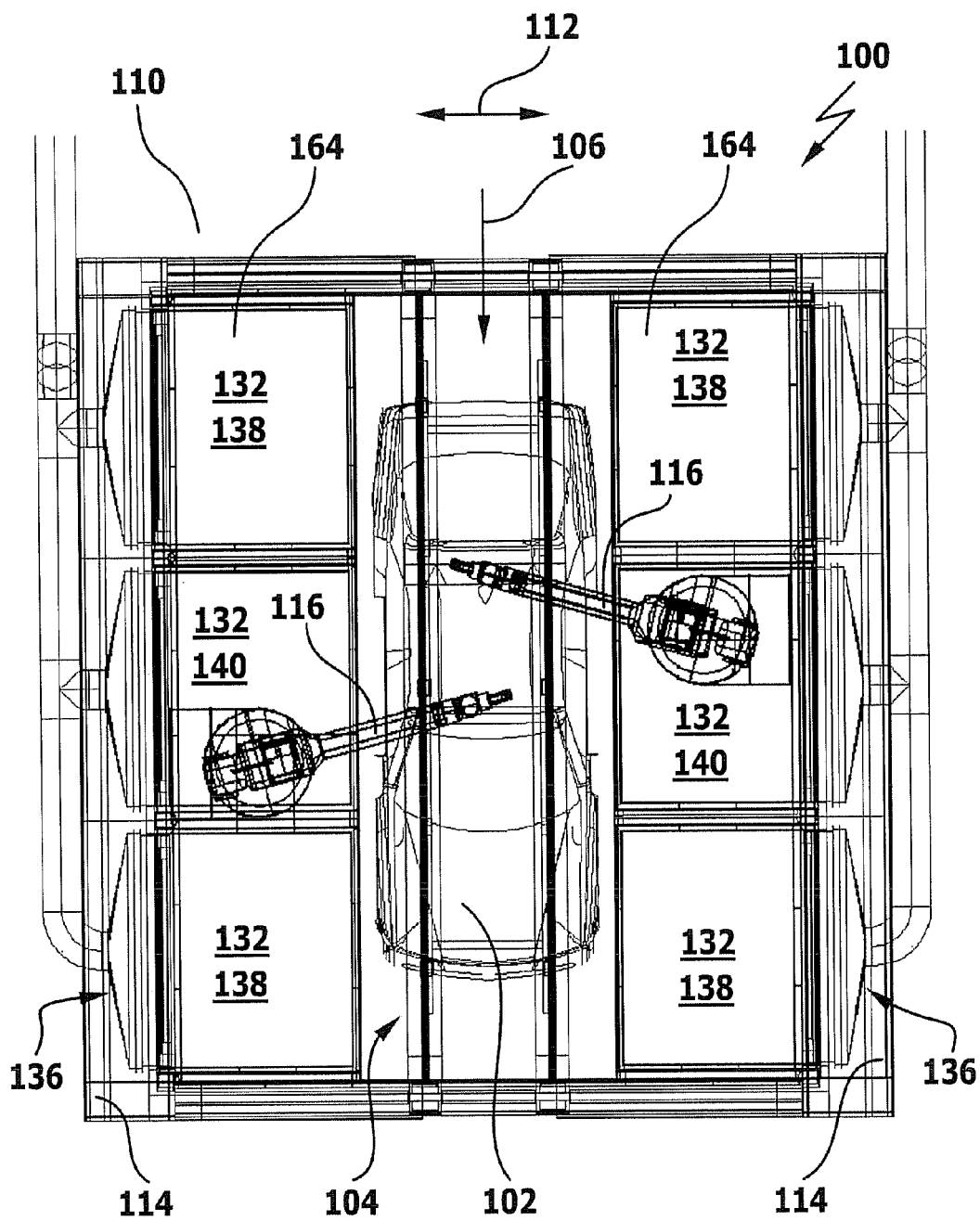
FIG. 3 a schematic plan view from above of the plant depicted in FIGS. 1 and 2.

An air flow is produced by means of an (only partially illustrated) air circulating loop which passes downwardly through the application area 108 in a substantially vertical direction from above, as is indicated in FIG. 2 by the arrows 118.

This air flow picks up paint overspray in the form of overspray particles in the application area 108. Herein, the term "particle" includes both solid and liquid particles and in particular, droplets.

Figure 6:
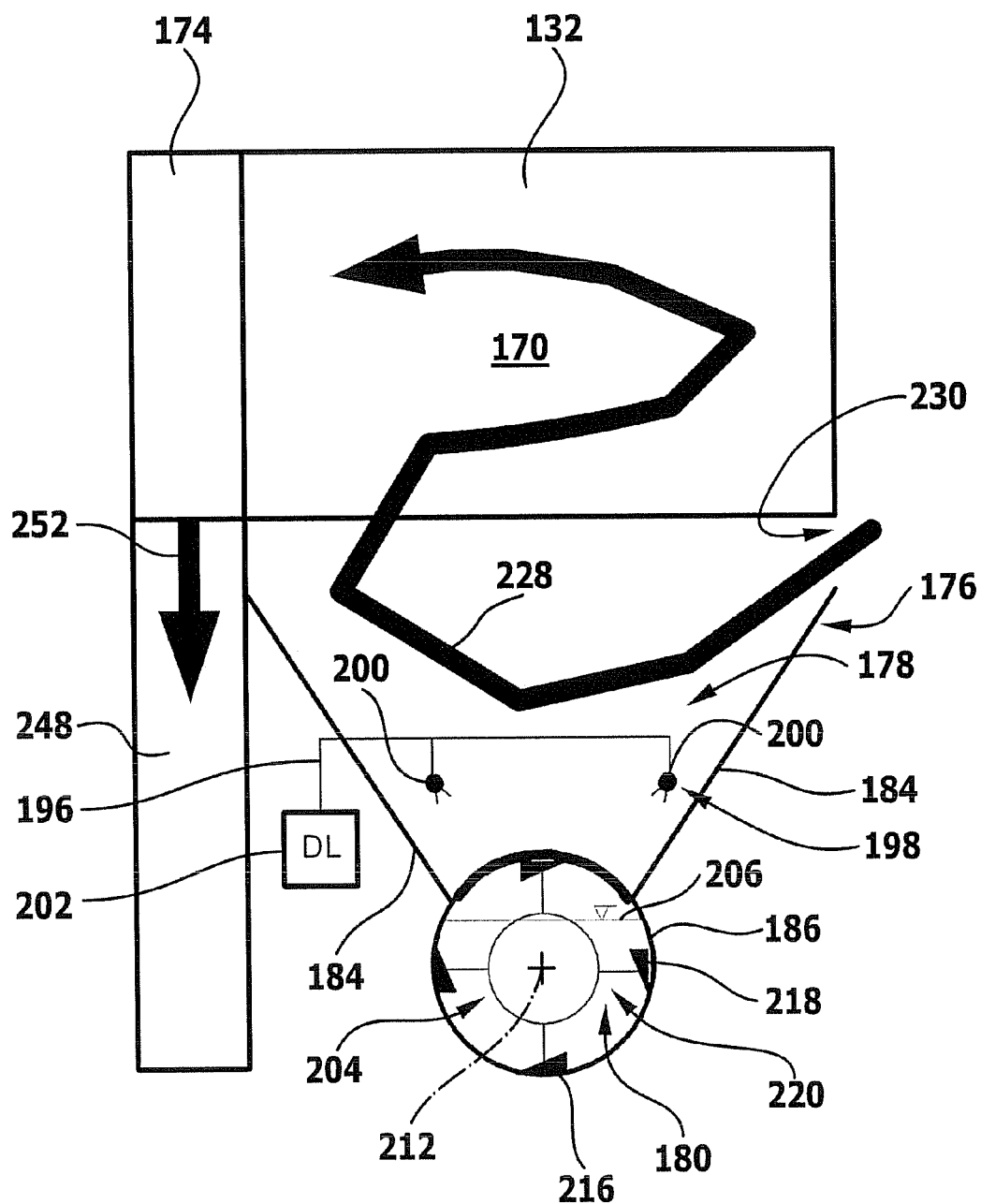
FIG. 6 a schematic cross section through a filter module and a reservoir with a mixing device that is arranged below it.

When using a wet painting process, the wet paint overspray consists of paint droplets. The largest dimension of most of the overspray particles lies within a range of approximately 1 µm to approximately 100 µm The exhaust air stream loaded with the overspray particles from the application area 108 is referred to hereinafter as the stream of crude gas. The direction of flow of the stream of crude gas is illustrated in FIGS. 2 and 6 by the arrows 120.

The stream of crude gas leaves the painting booth 110 in the downward direction and enters a device bearing the general reference 126 which is used for separating wet paint overspray from the stream of crude gas and is arranged below the application area 108.

The device 126 comprises a substantially parallelepipedal flow chamber 128 which extends over the entire length of the painting booth 110 in the direction of conveying 106 and is bounded in the transverse direction 112 by vertical side walls 130 which are substantially flush with the lateral booth walls 114 of the painting booth 110 so that the flow chamber 128 is of substantially the same horizontal cross-sectional area as the painting booth 110 and is arranged substantially entirely within the vertical projection of the surface area of the painting booth 110.

Figure 7:
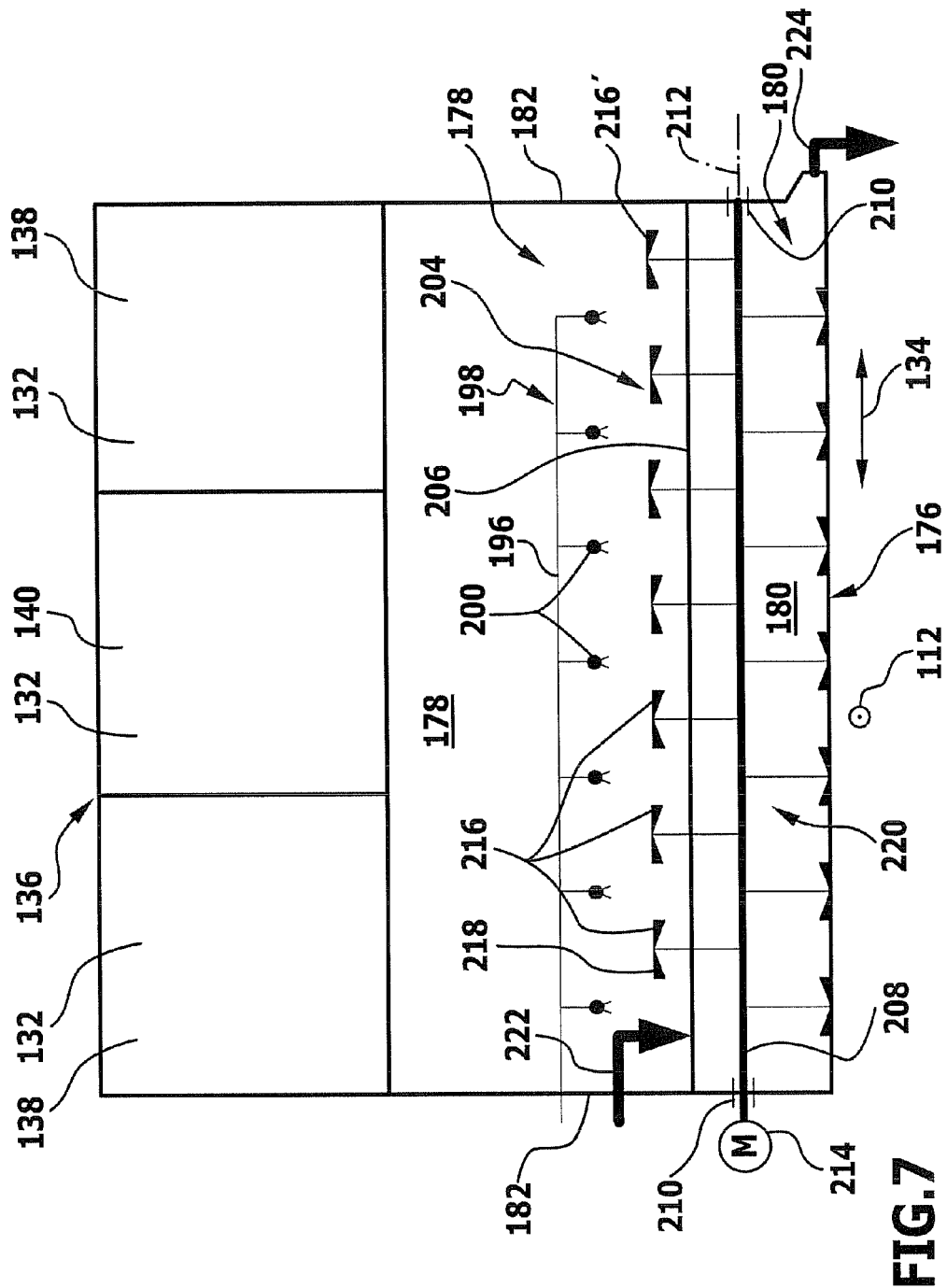
FIG. 7 a schematic longitudinal sectional view through three filter modules that succeed one another in a longitudinal direction of the plant and a reservoir with a mixing device that is arranged below the filter modules.
Figure 8:
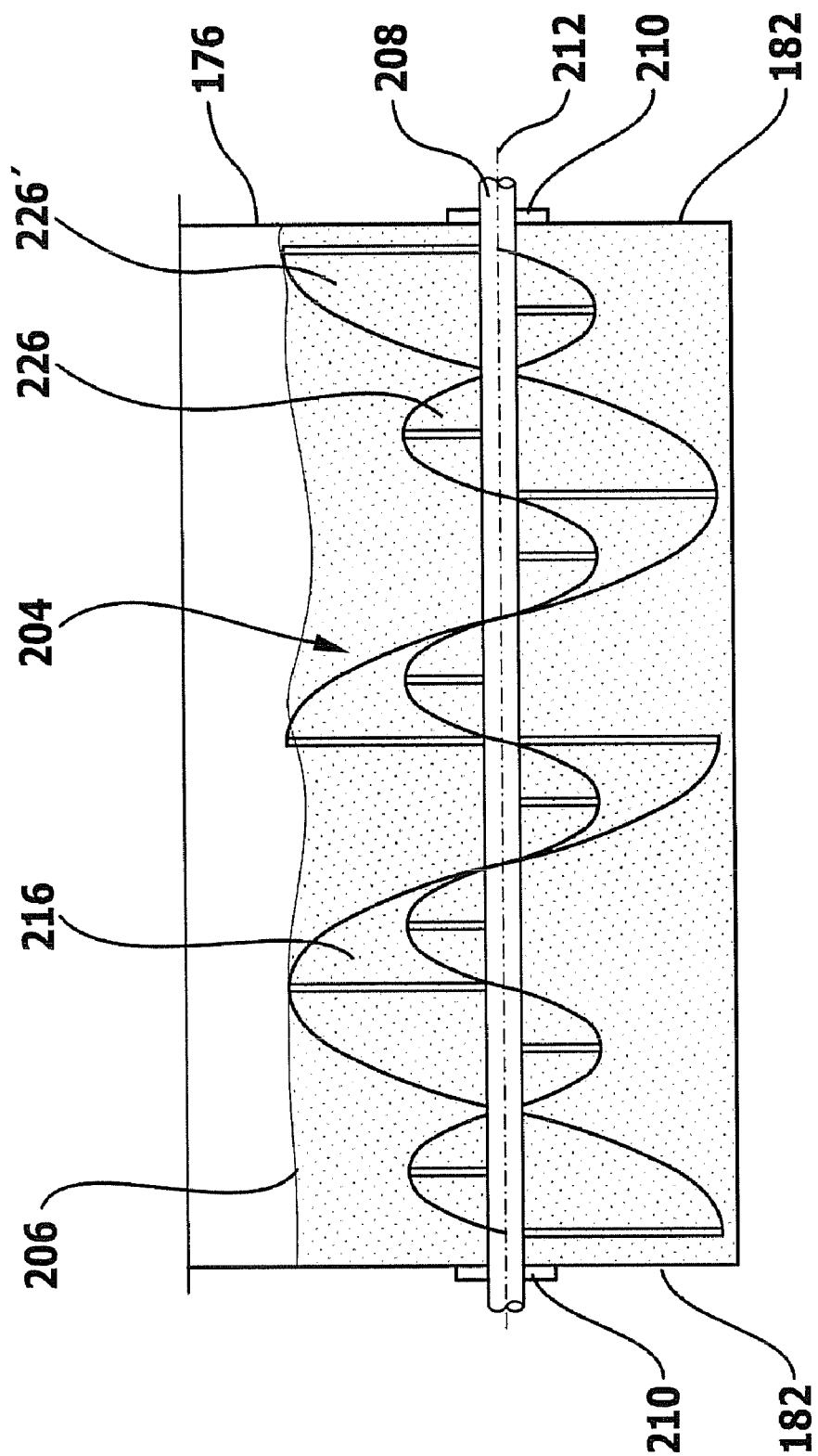
FIG. 8 a schematic side view of a mixing device incorporating two helices which have opposed directions of rotation and are rotatable about a horizontal axis of rotation.

As can best be seen from FIG. 7, a plurality of, three for example, filter modules 132 are arranged on each of the two sides of the flow chamber 128, these forming two rows of modules 136 which extend in the longitudinal direction 134 (which coincides with the direction of conveying 106) of the device 126 for separating wet paint overspray.

Each of the rows of modules 136 comprises two corner modules 138 which respectively form one end of a row of modules 136, and at least one central module 140 which is arranged between two neighbouring filter modules 132.

Each of the filter modules 132 is in the form of a pre-assembled unit 154 which is manufactured at a point remote from the position in the paint shop where it will be mounted and is transported as a unitary item to its mounting position in the paint shop. At the mounting position thereof, the pre-assembled unit 154 is arranged in its envisaged working position and connected to one or more neighbouring pre-assembled units 154 and also to a supporting structure for the application area 108.

Figure 4:
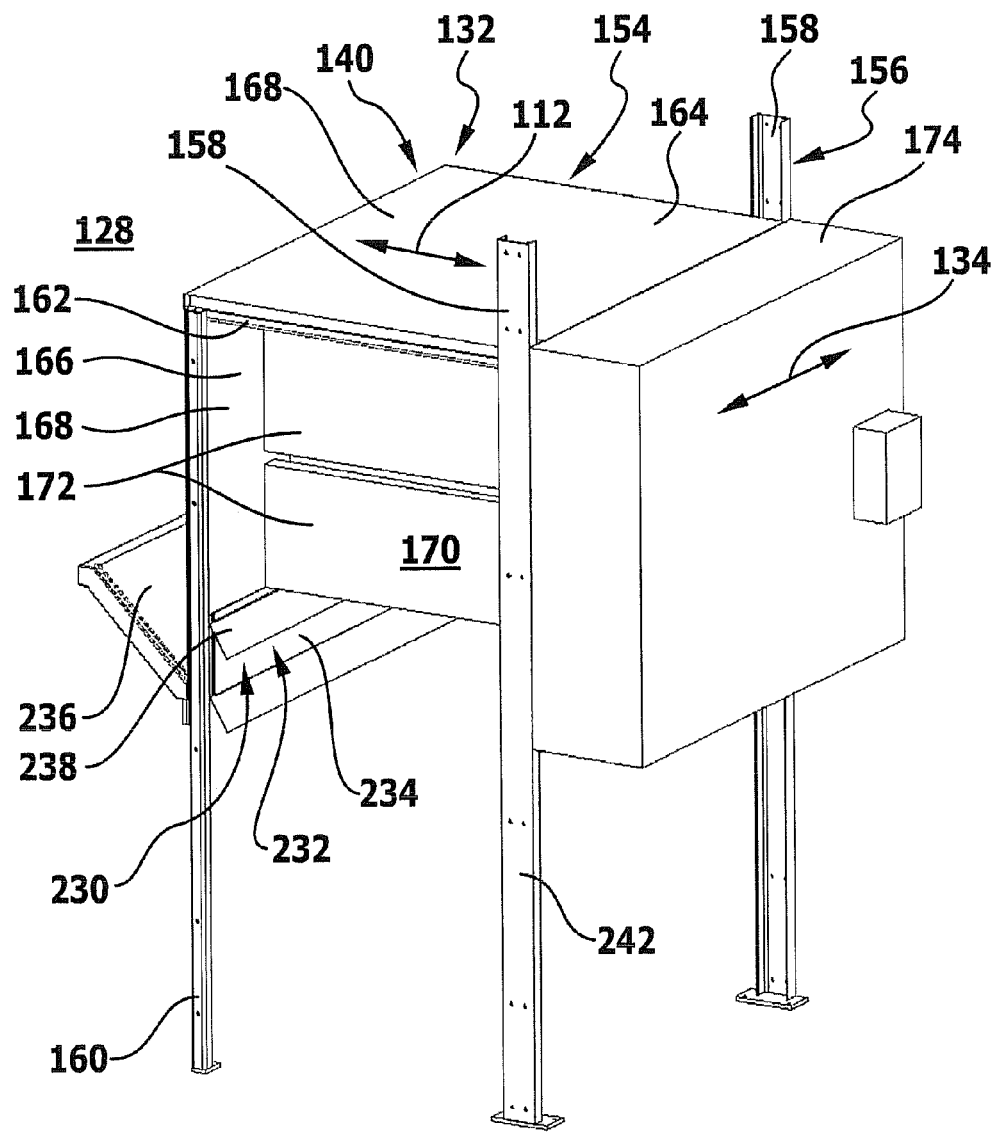
FIG. 4 a schematic perspective illustration of an individual filter module which is intended to be arranged between two neighbouring further filter modules (central module)
Figure 5:
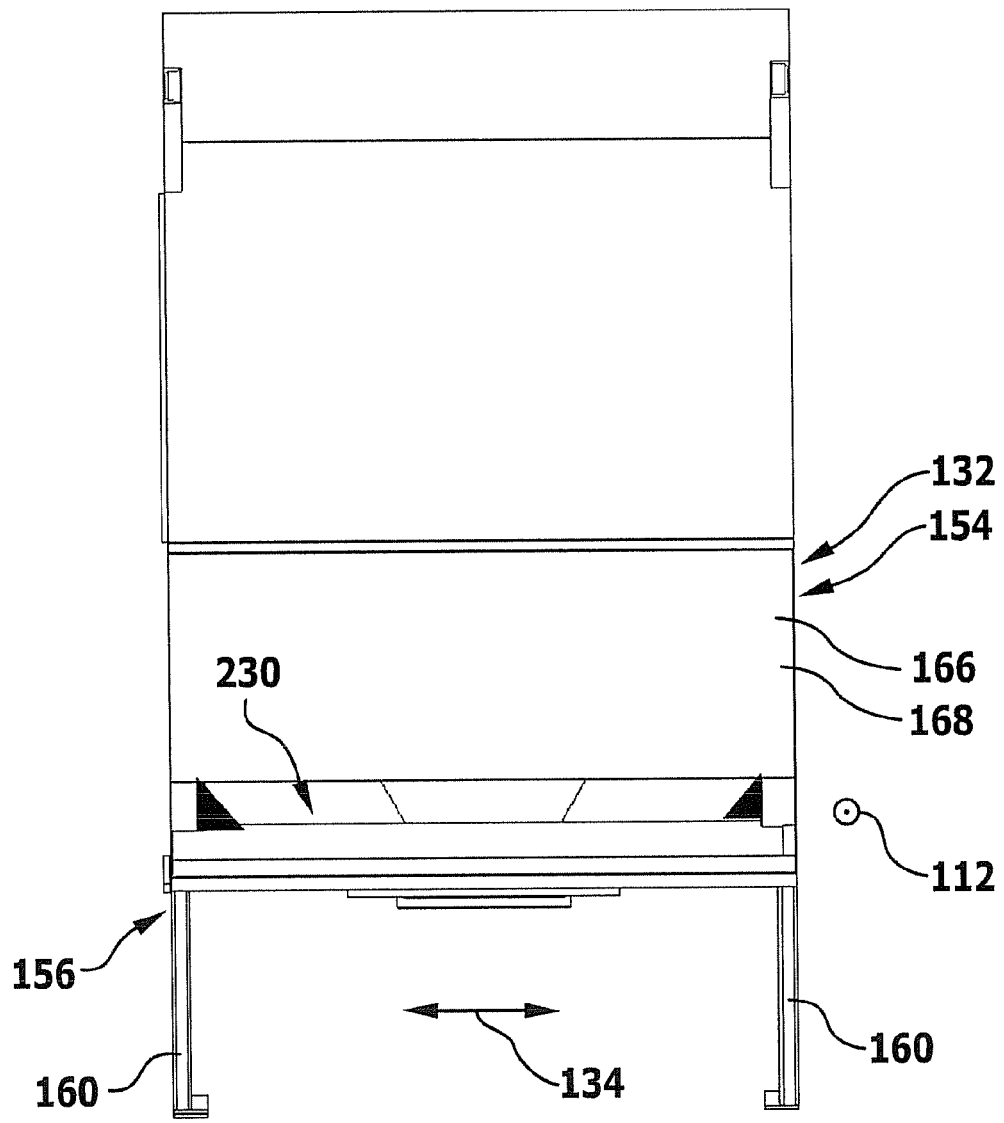
FIG. 5 a schematic front view of the filter module depicted in FIG. 4.

In the following description, the construction of a filter module 132 will be described with reference to FIGS. 4 and 5 using the example of a central module 140:

The module comprises a supporting structure 156 consisting of two vertical rear supports 158 and two vertical front supports 160 which are respectively connected at their upper ends by horizontal tie bars 162 to a respective one of the rear supports 158 (FIG. 4).

Furthermore, the front supports 160 are connected together at their upper ends by means of a further (not illustrated) tie bar.

In addition, the rear supports 158 are connected together by means of (not illustrated) tie bars or by means of a (not illustrated) connecting framework.

The tie bars at the upper end of the support structure 156 carry a horizontal covering wall 164.

A vertical front wall 166 of the filter module 132 is held on the front faces of the front supports 160.

The covering wall 164 and the front wall 166 form partition walls 168 of the filter module 132 which separate a filter element accommodating chamber 170 that is arranged within the filter module 132 from the region of the flow chamber 128 located outside the filter module 132.

In order to enable two filter modules 132 that are arranged next to each other in a module row 136 to be connected together in a simple and stable manner or a filter module 132 to be connected to an adjacent boundary wall of the flow chamber 128, the support structure 156 of each filter module 132 comprises at least one rear support 158 which has a substantially flat contact surface 242 which is oriented vertically and in the transverse direction 112 and can be laid on a corresponding contact surface 242 of a neighbouring filter module 132 or on a neighbouring boundary wall.

The rear support 158 serving for the connection to a neighbouring filter module 132 preferably has an approximately U-shaped profile.

As can be seen from FIG. 4, each central module 140 comprises two rear supports 158 having U-shaped profiles the open sides of which face each other so that the central module 140 can be connected on both sides to an adjacent further filter module 132.

By contrast however, each corner module 138 comprises only one rear support 158 which has a U-shaped profile; the respective opposite rear support 158 which does not have to be connected to a neighbouring filter module 132 can, for example, have a T-shaped profile rather than a U-shaped profile in order to increase its mechanical rigidity.

In all other respects, the corner modules 138 correspond in regard to the construction and functioning thereof with the central modules 140 which were described in detail hereinabove.

In the filter element accommodating chamber 170 of the filter module 132, a plurality of, for example ten, filter elements 172 are arranged one above the other in two rows which project in the horizontal direction from a common base body 174 that is held on the rear surfaces of the rear supports 158.

The filter elements 172 can, for example, be formed from plates consisting of sintered polyethylene which are provided on their outer surfaces with a membrane of polytetrafluorethylene (PTFE).

The coating of PTFE serves to increase the filter class of the filter elements 172 (i.e. to reduce their permeability) and furthermore, to prevent permanent adherence of the wet paint overspray that has been separated from the stream of crude gas.

Both the base material of the filter elements 172 and the PTFE coating thereon exhibit porosity so that the crude gas can enter into the interior of the respective filter element 172 through the pores.

Furthermore, in order to prevent the filter surfaces from sticking together, they are provided with a barrier layer consisting of a filter aid material which has been added to the stream of crude gas.

This preferably particle-like aid material is also commonly referred to as a "precoat" material.

When the device 126 is operative, the barrier layer is formed by the deposition of the filter aid material being delivered by the stream of crude gas 120 onto the filter surfaces, and it prevents the filter surfaces from sticking together as a result of the wet paint overspray adhering thereto.

Filter aid material from the stream of crude gas 120 is also deposited on the inner surfaces of the covering wall 164 and the front wall 166 of the filter module 132 where it likewise prevents the wet paint overspray from adhering thereto.

In principle, any medium which is capable of being absorbed as a fluidic component of the wet paint overspray can be used as the filter aid material.

In particular for example, chalk, stone dust, aluminium silicates, aluminium oxides, silicon oxides, coating powders or the like come into consideration as filter aid materials.

As an alternative or in addition thereto, particles having a cavity-like structure and having a large internal surface area relative to their external dimensions, such as zeolites or other hollow, for example spherical bodies consisting of polymers, glass or aluminium silicate and/or natural or synthetically produced fibres for example can also be used as filter aid materials for absorption by and/or bonding with the overspray.

As an alternative or in addition thereto, particles which are chemically reactive with the overspray such as chemically reactive particles from the amine-, epoxy-, carboxyl-, hydroxyl- or isocyanate groups, chemically reactive particles consisting of aluminium oxide post-treated with octyl silanes or solid or liquid monomers, oligomers or polymers, silanes, silanols or siloxanes for example can also be used as filter aid materials for absorption by and/or bonding with the overspray.

The filter aid material preferably consists of a multiplicity of particulate filter aid materials having an average diameter within a range of approximately 10 μm to approximately 100 μm for example.

In order to enable the aid material to be supplied to the stream of crude gas without any danger of the filter aid material reaching the application area 108 of the paint shop 100 and also in order to enable filter aid material that has been cleansed from the filter elements 172 together with wet paint overspray to be collected, provision is made for each group of a plurality of, three for example, filter modules 132 to have associated therewith a common reservoir 176 which extends in the longitudinal direction 134 of the device 126 over the entire length of the associated, three for example, filter modules 132 (see FIG. 7).

The reservoir 176 is substantially in the form of a trough and it has an upper inlet section 178 as well as a mixing section 180 which adjoins the inlet section 178 at the lower end thereof.

The inlet section 178 is bounded by two end walls 182 which extend perpendicularly relative to the longitudinal direction 134 and two mutually opposite side walls 184 which extend from the one end wall 182 up to the other end wall 182 and are inclined to the vertical at an angle of at least approximately 30°.

The mixing section 180 adjoining the lower end of the inlet section 178 is substantially cylindrical and comprises an outer wall 186 which is in the form of a section of a cylinder and extends over a peripheral angle of approximately 270° for example, the upper edges of the outer wall adjoining the lower edges of the side walls 184 of the inlet section 178 of the reservoir 176 so that the mixing section 180 opens out upwardly into the inlet section 178.

A fluidising means 198 which is held on one of the side walls 184 of the inlet section 178 of the reservoir 176 serves to deliver pulses of compressed air into the material which is located therebelow and accommodated in the reservoir 176 in order to whirl up this material and thus introduce this material, including the filter aid material contained therein, into the stream of crude gas which is being passed through the inlet section 178 of the reservoir 176.

When the plant 100 is functioning, the fluidising means 198 is operated intermittently, for example, four times per minute for approximately 5 seconds on each occasion.

The fluidising means 198 comprises a plurality of, at least two per filter module 132 for example, outlet nozzles 200 for the supply of compressed air, the nozzles being in the form of cone jets each of which can produce a cone of compressed air that widens out downwardly towards the mixing section 180 of the reservoir 176.

The outlet nozzles 200 are arranged in a compressed air pipeline 196 which is passed through one of the side walls 184 of the inlet section 178 of the reservoir 176 and leads to a source of compressed air 202 located outside the reservoir 176.

In the mixing section 180 of the reservoir 176, there is arranged a mixing device 204 for effecting the thorough mechanical intermixing of the material which has been cleansed from the filter elements 172 of the different filter modules 132 and which fills the mixing section 180 up to a level 206 (FIG. 6).

As can best be seen from FIG. 7, the mixing device 204 comprises a rotary shaft 208 which extends in parallel with the longitudinal direction 134 of the device 126 and is mounted by means of bearings 210 on the end walls 182 of the reservoir 176 such as to be rotatable about a horizontal axis of rotation 212 running parallel to the longitudinal direction 134.

One end of the rotary shaft 208 is passed in fluid-tight manner through one of the end walls 182 of the reservoir 176 and is coupled to a rotary drive means 214 (an electric drive motor for example) which is located outside the reservoir 176.

The rotary shaft 208 of the mixing device 204 can extend over the entire length of the painting booth 118 of approximately 20 m for example.

The volume of the material required to fill the mixing section 180 of the reservoir 176 can amount to at least 750 l for example.

A plurality of mixing tools 216 which can be in the form of paddles 218 or ploughshares for example are fixed onto the rotary shaft 208 such as to rotate therewith.

The inner contour of the mixing section 180 of the reservoir 176 is adapted to the outer contour of the mixing tools 216 of the mixing device 204 in such a way that, in the course of a complete revolution of the rotary shaft 208 of the mixing device 204 about its axis of rotation 212, the mixing tools 216 will sweep over a mixing region 220 the outer contour of which substantially corresponds to the inner contour of the mixing section 180 of the reservoir 176.

Preferably, the mixing device 204 sweeps over substantially the entirety of the mixing section 180 of the reservoir 176 whilst completing a full revolution about its axis of rotation 212.

Due to the mixing movement of the mixing device 204 as it is driven by means of the rotary drive means 214, the binding forces between the particles of which the material in the reservoir 176 consists is destroyed and blending of the material in the longitudinal direction of the rotary shaft 208 is effected so that there are no differences in concentration within the reservoir 176 and in particular the proportion of fresh filter aid material on the one hand to that of the filter aid material cleansed from the filter elements 172 and wet paint overspray on the other is substantially equally great everywhere in the reservoir 176.

In order to enable fresh filter aid material to be supplied to the reservoir 176, an inlet 222 for fresh filter aid material, which is connected to a (not illustrated) source of fresh filter aid material, is provided in one end wall 182 of the reservoir 176.

In the end wall 182 facing the inlet 222 for fresh filter aid material, there is provided a material outlet opening 224 which is arranged in the lower region of the mixing section 180 close to the lower rounded part of the cylindrical mixing section 180.

Filter aid material that has been enriched with wet paint overspray can be extracted from the reservoir 176 through this material outlet opening 224 in order to maintain the filling level 206 of the reservoir 176 substantially constant despite the supply of fresh filter aid material through the inlet 222.

A mixing tool 216' which assists in the process of discharging the material through the material outlet opening 224 is arranged on the rotary shaft 208 near the material outlet opening 224, said mixing tool 216' protruding from the rotary shaft 208 in the radial direction or towards an end wall in the axial direction.

Instead of having just one paddle 218 protruding from the rotary shaft 208 in the radial direction, the mixing tools 216 of the mixing device 204 could also be in the form of a helix 226 which is coaxial with the axis of rotation 212 of the mixing device 204.

In particular, the mixing device 204 can be provided with two helices 226, 226' which have mutually opposed directions of rotation.

These helices may have the same pitch, but are of different radii.

Due to the opposed directions of rotation of the two helices 226, 226', particularly thorough intermixing of the material located in the mixing section 180 is achieved.

Furthermore, due to the action of the mixing device 204, the surface of the material in the reservoir 176 is smoothed, and material bridges that may be formed in the reservoir 176 as a result of an undermining process are broken up.

In order to subdivide the stream of crude gas entering the filter modules 132 from the flow chamber 128 into partial streams of crude gas 228 which are each associated with a respective filter module 132, so as to properly direct these streams of crude gas 228 into the inlet section 178 of a respective reservoir 176, and so as to prevent the stream of crude gas coming from the flow chamber 182 having direct access to the filter elements 172, each filter module 132 is provided with a slit-like inlet opening 230 which is in the form of an inlet channel 232 the through-flow cross section of which narrows in the direction of flow of the stream of crude gas 228 towards a narrow section 234.

As an alternative or in addition thereto, provision may also be made for the inlet channel 232 to have a through-flow cross section which widens out in the direction of flow of the stream of crude gas away from a narrow section 240.

The inlet channel 232 is bounded downwardly by a sloping intake member 236 which extends in an upwardly sloping direction from the front supports 160 of the support structure 156 and is inclined at an angle of approximately 40° to approximately 65° with respect to the horizontal for example.

The intake member 236 extends in the longitudinal direction 134 of the flow chamber 128 over substantially the entire length of the inlet opening 230 of approximately 1 m to approximately 2 m for example, this virtually corresponding to the extent of the entire filter module 132 in the longitudinal direction 134.

In the upward direction, the inlet opening 230 is bounded by the lower edge of the front wall 166 and by an upper guide plate 238 which is inclined downwardly into the interior of the filter module 132 from the lower edge of the front wall 166.

The upper guide plate 238 is inclined to the horizontal at an angle of approximately 55° to approximately 70° for example and extends in the longitudinal direction 134 over substantially the entire width of the inlet opening 230 of 1 m or 2 m for example.

Due to this upper guide plate 238 for the partial stream of crude gas 228, the effect is achieved that the stream of crude gas does not break-away at the front wall 166 of the filter module 132, but rather is deflected directly into the reservoir 176 (see FIG. 6).

When the filter module 132 is functioning, the upper guide plate 238 is provided with a coating of the filter aid material so that the upper guide plate 238 is easy to clean and overspray does not adhere directly to the upper guide plate 238.

As a result of the geometrical configuration of the inlet opening 230 described above, the effect is achieved that the inlet opening 230 comprises a narrow section 234 at which the through-flow cross section of the inlet opening 230 is smallest and therefore the speed of the crude gas is greatest.

Preferably, the speed of the crude gas in the narrow section amounts to approximately 2 m/s to approximately 8 m/s, in particular, approximately 3 m/s to approximately 5 m/s.

In this way, the filter aid material is effectively prevented from entering the flow chamber 128, and from there the application area 108, from the interior of the filter module 132 which forms a closed box. Consequently, the fluidisation of the filter aid material in the reservoir 176 and the cleansing of the filter elements 172 can take place at any point in time without it being necessary to interrupt the supply of crude gas to the filter module 132 or even having to interrupt the operation of the paint spraying devices 116 in the application area 108.

Furthermore, in that the partial stream of crude gas 228 emerges from the respective inlet opening 230 directed into the reservoir 176, it is ensured that a redirection of the partial stream of crude gas 228 occurs in the inlet section 178 of the reservoir 176. Thus, an adequate quantity of filter aid material, which is produced by the process of fluidising the substance in the reservoir 176, is carried along by the partial stream of crude gas 228.

The flow of the stream of crude gas from the flow chamber 128 through the inlet opening 230 into the interior of the filter module 132 is schematically illustrated in FIG. 6. From this, it can clearly be seen that a rotary drum-like flow having a horizontally extending axis is formed in the interior of the filter module 132.

At the side of the reservoir 176 opposite the inlet opening 230, the stream of crude gas, which is now loaded with filter aid material, flows out of the inlet section 178 of the aid material reservoir 176 and is then distributed through the entire volume of the filter element accommodating chamber 170 so that turbulence occurs around the filter elements 172 and, due to the high dynamics imparted to the stream of crude gas 228 in the narrow section 234, a homogeneous distribution of the filter aid material on the individual filter elements 172 is ensured.

During the operation of each filter module 132, the partial stream of crude gas 228 entering the respective filter module 132 sweeps over the filter surfaces of the filter element 172, whereby the filter aid material being carried along therewith and the wet paint overspray that is also being carried along therewith is deposited on the filter surfaces, and the filtered crude gas reaches the interiors of the filter elements 172 through the porous surfaces of the filters in the form of a stream of exhaust air, said interiors being connected to a cavity within the base body 174 from which the filter elements 172 project. From this cavity, the cleansed stream of exhaust air enters a respective exhaust air pipe 248 which leads from the base body 174 of the filter elements 172 of each filter module 132 to an exhaust air duct 250 that runs parallel to the longitudinal direction 134 of the flow chamber 128 and is arranged approximately centrally under the flow chamber 128 (see in particular, FIGS. 1 and 2).

The direction of flow of the exhaust air stream is indicated in FIG. 2 by the arrows 252.

From the exhaust air duct 250, the exhaust air that has now been cleansed of wet paint overspray arrives at a (not illustrated) exhaust air fan, from where the cleansed exhaust air is supplied via a (not illustrated) cooling stack and a (not illustrated) supply line to a (not illustrated) air chamber, the so-called plenum, which is arranged above the application area 108.

From this air chamber, the cleansed exhaust air is returned to the application area 108 via a filter cover.

A (not illustrated) exhaust air line, through which a part of the cleansed stream of exhaust air is transferred to the environment (via a chimney for example), is branched off from the supply line.

This part of the stream of exhaust air that has been transferred to the environment is replaced by fresh air which is fed into the flow chamber 128 by means of two air curtain producing devices 254 that are connected to a (not illustrated) air supply system by means of a respective air supply line 256 (FIGS. 1 and 2).

Each of the air curtain producing devices 254 produces a respective air curtain which is directed from the respectively associated air curtain producing device 254 in a substantially horizontal direction along the top sides of the cover walls 164 of the filter modules 132 to a narrow section 262 between the upper edges of the mutually facing module rows 136, this thereby preventing the stream of crude gas 120 that is loaded with the wet paint overspray from the application area 108 from reaching the upper surface of the filter modules 132 and depositing the wet paint overspray from the stream of crude gas 120 on the upper surface of the filter modules 132.

The mean direction of flow of the air in the transverse air curtains produced by the air curtain producing devices 254 on the upper surface of the filter modules 132 is illustrated in FIG. 2 by the arrows 264.

The greater part of the air being passed through the application area 108 is thus re-circulated around an air circulating loop which comprises the application area 108, the flow chamber 128, the filter modules 132, the exhaust air pipes 248, the exhaust air duct 250, the exhaust air fan as well as the supply line and the air chamber above the application area 108, this thereby preventing the air that is being fed around the air circulating loop from being constantly heated by the influx of fresh air via the air curtain producing devices 254.

Since the separation of the wet paint overspray from the partial streams of crude gas 228 by means of the filter elements 172 is effected by means of a dry process, i.e. it is not washed out with the aid of a cleaning fluid, the air being fed around the continuous air loop is not moistened during the process of separating out the wet paint overspray so that no devices whatsoever are required for dehumidifying the air being fed around the air circulating loop.

Furthermore, devices for separating wet paint overspray from such a washing-cleaning fluid are also not necessary.

The filter elements 172 of the filter modules 132 are cleansed at defined time intervals by pulses of compressed air when their loading with wet paint overspray and filter aid material reaches a predetermined level.

This cleansing process can (in dependence on the rise in loss of pressure in the filter elements 172) be effected once to six times per 8-hour working shift, i.e. approximately every 1-8 hours, for example.

The requisite pulses of compressed air are produced by means of a (not illustrated) pulse-producing unit which is arranged on the base body 174 of the filter elements 172 of each filter module 132, wherein the pulse-producing unit is capable of delivering pulses of compressed air to compressed air tubes which run within the respective base body 174 and lead from the pulse-producing unit into the interiors of the filter elements.

From the interiors of the filter elements 172, the pulses of compressed air pass through the porous filter surfaces into the filter element accommodating chamber 170, whereby the barrier layer consisting of filter aid material and the wet paint overspray deposited thereon which is formed on the filter surfaces is removed from the filter surfaces so that these filter surfaces revert to their original clean condition.

In the device 126 for separating wet paint overspray described hereinabove, the filter aid material is added to the partial streams of crude gas 228 exclusively by the process of fluidising the filter aid material in the respectively associated reservoir 176.

In order to enable the filter aid material mixed with overspray that has accumulated in the reservoir 176 to be removed and fed off to a disposal or processing utility, the device 126 for separating wet paint overspray comprises a (not illustrated) filter aid material separation device which is attached to the material outlet openings 224 of the reservoir 176 and, for example, comprises a suction fan for extracting the material from the reservoirs 176.

The material extracted from the reservoirs 176 which contains filter aid material together with overspray particles can either be disposed of or—possibly after being reprocessed—be reused to at least a partial extent in the coating plant.

Figure 9:
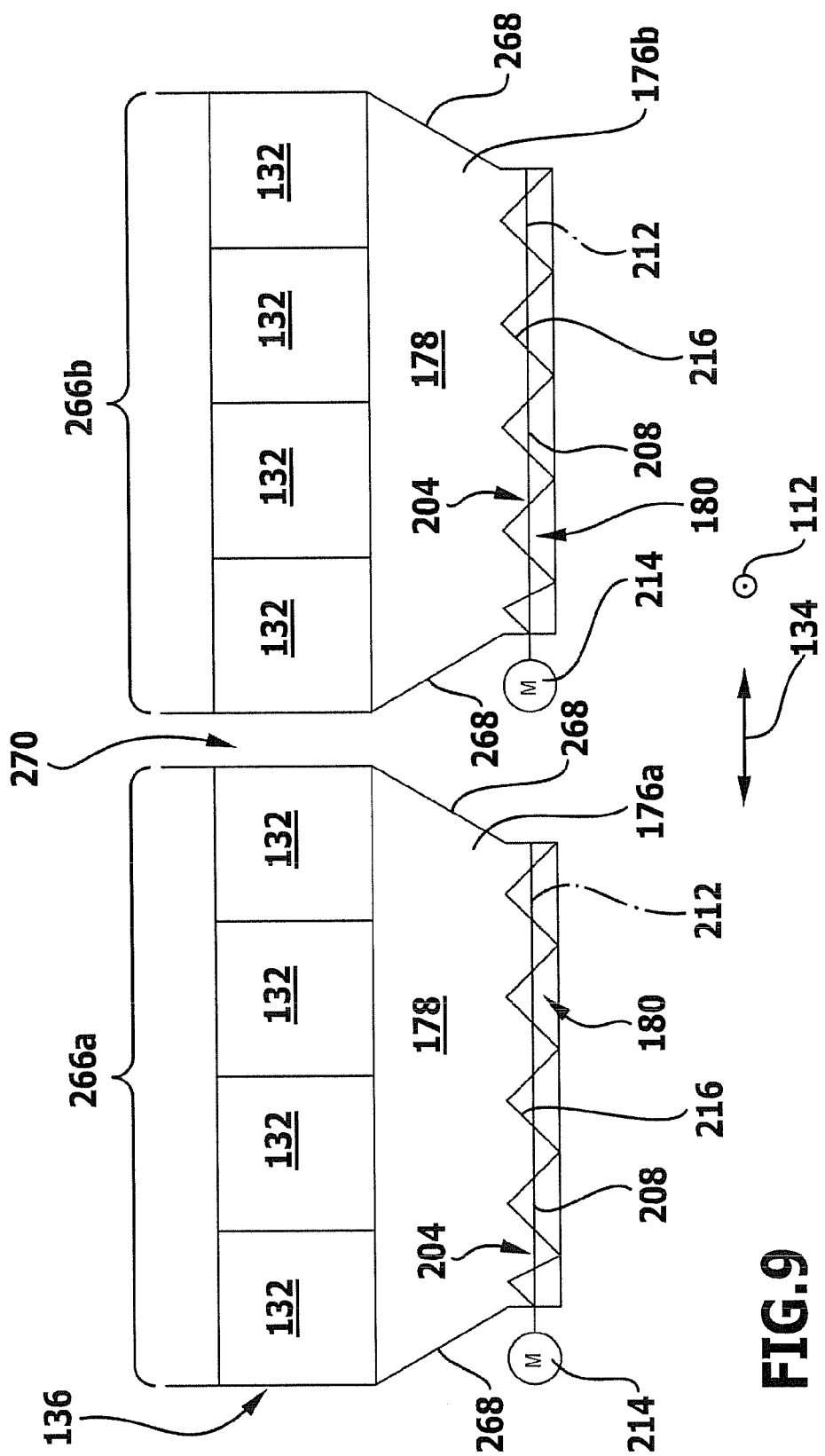
FIG. 9 a schematic side view of two groups each of which comprises four filter modules, wherein each group of filter modules has associated therewith a reservoir with a mixing device for intermixing the material that has been cleansed from the filter modules of a respective group.

A second embodiment of a device 126 for separating wet paint overspray which is illustrated in FIG. 9 in the form of a schematic side view of a module row 136, differs from the previously described device 126 in that just a single reservoir 176 which extends over the entire length of the module row 136 is not associated with all the filter modules 132 of a module row 136 that are arranged one behind the other in the longitudinal direction 134 of the device 126, but instead, each module row 136 is subdivided into a plurality of, two for example, groups of modules 266a, 266b each of which comprises a plurality of, four for example, filter modules 132 and each group of modules 266a, 266b has associated therewith a respective reservoir 176a and 176b which receives the material (filtering aid material and wet paint overspray) that has been cleansed from the filter elements 172 of the filter modules 132 in the respective group of modules 266a, 266b.

Thus, in this embodiment of the device 126 for separating wet paint overspray, at least two reservoirs 176a, 176b are arranged successively in the longitudinal direction 134, wherein however, each reservoir 176a, 176b still receives the material that has been cleansed from a plurality of filter modules 132.

Furthermore, each of the reservoirs 176a, 176b comprises a mixing device 204 by means of which the material originating from different filter modules 132 and caught by the respective reservoir 176a, 176b is arranged to be intermixed.

In this embodiment, the end walls 182 of the reservoirs 176a, 176b are not continuous in the vertical direction, but rather comprise an upper inclined end wall section 268 which borders the inlet section 178 at the front side and is inclined to the vertical in such a manner that the inclined end wall section 268 projects beyond the mixing section 180 of the relevant reservoir 176a, 176b in the longitudinal direction 134.

In consequence, sufficient space for accommodating a rotary drive means 214 for each mixing device 204 can be created below the inclined end wall sections 268 of the reservoirs 176a, 176b that follow each other in the longitudinal direction 134 and between the end walls of the mixing sections 180 of this reservoir 176a, 176b.

Furthermore, care should be taken to ensure that sufficient space is made available between the exhaust air pipes 248 and the reservoirs 176a, 176b for installing the rotary shaft 208 of each mixing device 204.

The groups of modules 266a, 266b which are arranged one behind the other in the longitudinal direction 134 of the device 126 may be associated with different painting booths or with differing painting sections within the same painting booth, for example a painting section for the interior paintwork of the vehicle bodies 102 on the one hand and a painting section for the external finish of the vehicle bodies 102 on the other.

As an alternative thereto, provision could also be made for different types of paint to be applied to the vehicle bodies 102 in the different painting sections with which the groups of modules of 266a, 266b are associated, for example a primer on the one hand and a clear lacquer on the other.

Paint is not applied to the vehicle bodies 102 in that area of the paint shop located above between the groups of modules 266a, 266b.

In all other respects, the second embodiment of a device 126 for separating wet paint overspray which is illustrated in FIG. 9 corresponds in regard to the construction and functioning thereof with the first embodiment illustrated in FIGS. 1 to 8 and insofar reference is made to the preceding description.

Figure 10:
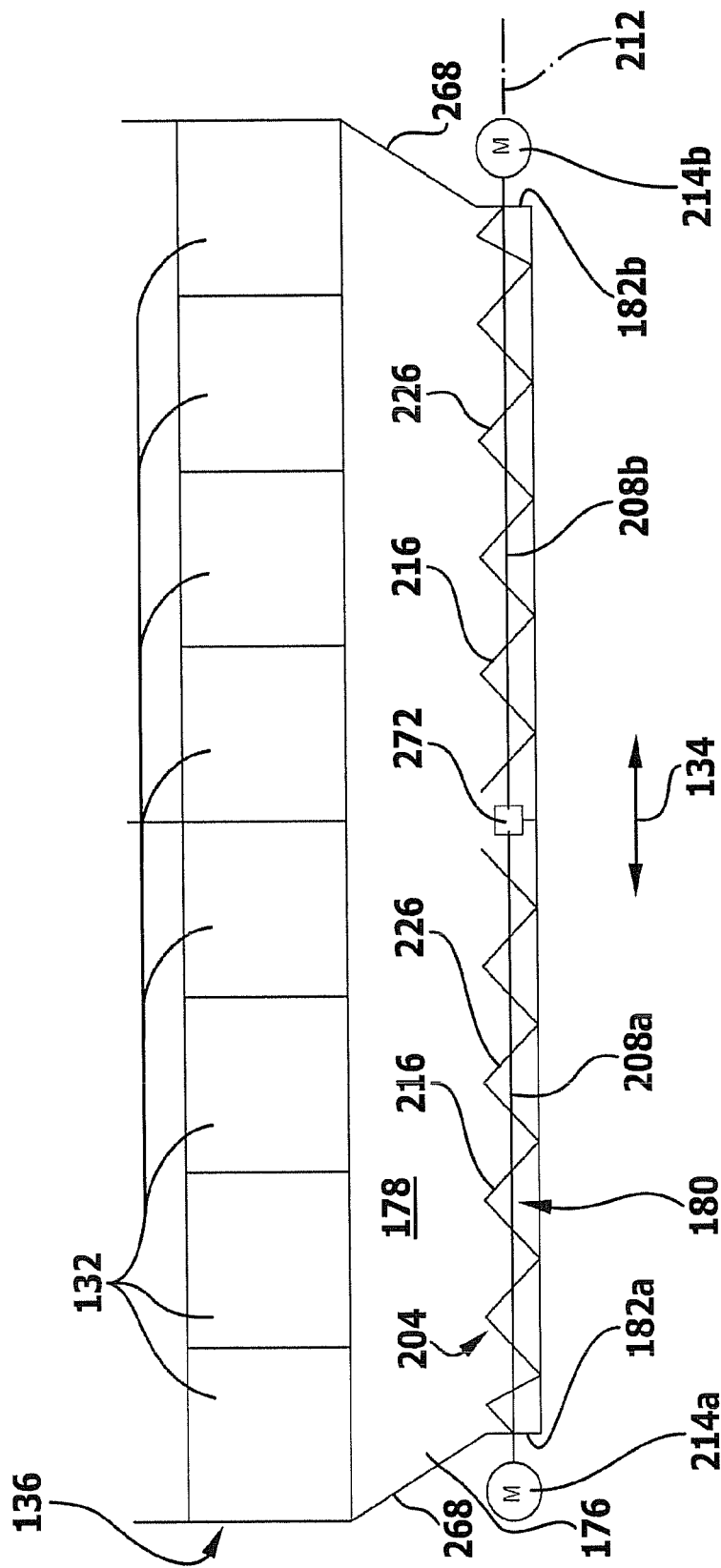
FIG. 10 a schematic side view of a group of eight filter modules, wherein associated with this large group of filter modules is a single long reservoir, the mixing device of which comprises two rotary shafts which are rotatable about a substantially horizontally oriented axis of rotation and are used for mounting mixing tools that are arranged one behind the other in the direction of the axis of rotation.

A third embodiment of a device 126 for separating wet paint overspray which is illustrated in FIG. 10 in the form of a schematic side view of a module row 136 differs from the first embodiment illustrated in FIGS. 1 to 8 in that the number of filter modules 132 associated with the same reservoir 176 is larger (eight filter modules 132 for example) so that the reservoir 176 has a very large extent in the longitudinal direction 134 of the device 126 (of 16 m or more for example).

With so great a length of reservoir 176, a very high powered rotary drive means 214 would have to be used in order to set in motion a rotary shaft 208 which is provided with mixing tools 216 and extends over the entire length of the reservoir 176.

Consequently, in the case of the third embodiment illustrated in FIG. 10, provision is made for the mixing device 204 to comprise two rotary shafts 208a, 208b which succeed one another in the longitudinal direction 134 and in the direction of the common axis of rotation 212 and each of which is driven by its own rotary drive means 214a, 214b, said drive means being respectively mounted in rotatable manner on the front end wall 182a and on the rear end wall 182b of the reservoir 176 as well as in a bearing 272 in the centre of the reservoir 176.

Each of the rotary shafts 208a, 208b is provided with one or more mixing tools 216, with helices 226 for example, for intermixing the material accommodated in the reservoir 176.

Due to the mixing tools 216 being shared between two mutually separately mounted and independently driven rotary shafts 208a, 208b, the drive power of the rotary drive means 214a, 214b which is required for producing the rotary motion of the mixing tools 216 can be reduced.

In this third embodiment too, the end walls 182a, 182b of the reservoir 176 are not continuous in the vertical direction, but rather comprise an upper inclined end wall section 268 which borders the inlet section 178 at the front side and is inclined to the vertical in such a manner that the inclined end wall section 268 projects beyond the mixing section 180 of the reservoir 176 in the longitudinal direction 134.

In consequence, sufficient space for accommodating a respective rotary drive means 214a, 214b for the mixing device 204 can be created below the inclined end wall sections 268.

In all other respects, the third embodiment of a device 126 for separating wet paint overspray which is illustrated in FIG. 10 corresponds in regard to the construction and functioning thereof with the first embodiment illustrated in FIGS. 1 to 8, and insofar reference is made to the preceding description.

The invention claimed is:

1. A device for separating wet paint overspray from a stream of crude gas containing overspray particles, comprising at least two filter devices which each comprise an inlet opening through which a partial stream of crude gas enters the respective filter device and at least one respective filter element for separating the overspray from the partial stream of crude gas, wherein a filter surface of the filter element is provided with a barrier layer comprising a filter aid material added to the stream of crude gas, wherein the device comprises at least one reservoir for receiving a mixture of filter aid material and wet paint overspray which has been cleansed from the filter elements of a plurality of filter devices and a mixing device for mechanically blending the cleansed mixture of filter aid material and wet paint overspray from a plurality of filter devices,
wherein the mixing device comprises at least one mixing tool which is rotatable about a substantially horizontally oriented axis of rotation.

2. A device in accordance with claim 1, wherein the reservoir is in the form of a trough which extends from a region located vertically below a first filter device into a region located vertically below a second filter device.

3. A device in accordance with claim 1, wherein the reservoir comprises a material outlet opening that is used for extracting filter aid material which is loaded with wet paint overspray from the reservoir.

4. A device in accordance with claim 1, wherein the reservoir comprises a material outlet opening, and wherein the mixing device comprises a mixing tool which assists the process of discharging material through the material outlet opening.

5. A device in accordance with claim 1, wherein the reservoir comprises an inlet for fresh filter aid material.

6. A device in accordance with claim 5, wherein the inlet for fresh filter aid material is arranged in a first end region of the reservoir, and wherein the reservoir comprises a material outlet opening which is arranged in a second end region of the reservoir located opposite the first end region.

7. A device in accordance with claim 1, wherein the mixing device comprises at least two helices having opposed directions of rotation.

8. A device in accordance with claim 1, wherein the filter aid material comprises particles having a hollow structure and a large internal surface area relative to their external dimensions.

9. A device in accordance with claim 1, wherein the filter aid material comprises particles which react chemically with the wet paint overspray.

10. A device in accordance with claim 1, wherein the filter aid material consists of a multiplicity of filter aid material particles which have an average diameter within the range of approximately 10 µm to approximately 100 µm.

11. A device in accordance with claim 1, wherein the device comprises a fluidising means which whirls up the material accommodated in the reservoir by means of pulses of compressed air so that it enters into the stream of crude gas.

12. A device in accordance with claim 1, wherein in the course of a complete revolution, the mixing device sweeps over a mixing region, and wherein the reservoir comprises a mixing section the inner contour of which is adapted to the outer contour of the mixing region.

13. A device in accordance with claim 1, wherein the reservoir comprises a mixing section, and wherein the mixing device sweeps over substantially the entire mixing section of the reservoir in the course of a complete revolution.

14. A method for separating wet paint overspray from a stream of crude gas containing overspray particles, comprising:
dividing the stream of crude gas into at least two partial streams of crude gas which enter at least two different filter devices through different inlet openings, said filter devices each comprising at least one filter element for separating the overspray from the respective partial stream of crude gas;
separating the overspray from the partial streams of crude gas by means of the filter elements;
cleansing material from the filter elements of a plurality of different filter devices;
collecting the cleansed material from the plurality of different filter devices in the same reservoir;
mechanically intermixing the cleansed material from the plurality of different filter devices in the reservoir by means of a mixing device,
wherein the mixing device comprises at least one mixing tool which is rotatable about a substantially horizontally oriented axis of rotation.

15. A method in accordance with claim 14, wherein a particulate filter aid material is added to the partial streams of crude gas and deposited on the surfaces of the filter elements, and wherein a mixture consisting of comprising filter aid material and wet paint overspray is cleansed from the filter elements of a plurality of different filter devices, is collected in the same reservoir and is mechanically intermixed in the reservoir by means of the mixing device.

* * * * *

UNITED STATES PATENT AND TRADEMARK OFFICE
CERTIFICATE OF CORRECTION

PATENT NO. : 8,241,406 B2
APPLICATION NO. : 12/859755
DATED : August 14, 2012
INVENTOR(S) : Jurgen Weschke Page 1 of 1

It is certified that error appears in the above-identified patent and that said Letters Patent is hereby corrected as shown below:

In column 17, line 4 (claim 15), after "and wherein a mixture" please delete "consisting of".

Signed and Sealed this
Ninth Day of April, 2013

Teresa Stanek Rea
*Acting Director of the United States Patent and Trademark Office*